(12) United States Patent
Jarvis

(10) Patent No.: US 6,325,579 B1
(45) Date of Patent: Dec. 4, 2001

(54) LIFT ASSIST MECHANISM FOR RAILROAD CAR DECK

(75) Inventor: James Jarvis, Portland, OR (US)

(73) Assignee: Gunderson, Inc., Portland, OR (US)

( * ) Notice: Subject to any disclaimer, the term of this patent is extended or adjusted under 35 U.S.C. 154(b) by 0 days.

(21) Appl. No.: 09/641,548

(22) Filed: Aug. 17, 2000

(51) Int. Cl.$^7$ ...................................................... B60P 7/08
(52) U.S. Cl. ................................ 410/26; 410/24; 410/28; 410/29; 410/29.1
(58) Field of Search ................................ 410/24, 26, 28, 410/28.1, 29, 29.1, 27; 105/370, 372, 375

(56) References Cited

U.S. PATENT DOCUMENTS

| | | |
|---|---|---|
| 1,965,525 | 7/1934 | Roscher et al. . |
| 2,066,714 | 1/1937 | Butterworth . |
| 2,137,979 | 11/1938 | Cooper . |
| 2,137,980 | 11/1938 | Nightingale . |
| 2,164,662 | 7/1939 | Nampa . |
| 2,647,009 | 7/1953 | Huebshman . |
| 3,003,435 | 10/1961 | Chapman . |
| 3,033,606 * | 5/1962 | Turner .................................. 410/29.1 |
| 3,230,900 | 1/1966 | Ruprecht et al. . |
| 3,646,627 | 3/1972 | Potter . |
| 4,019,442 | 4/1977 | Lee et al. . |
| 4,059,055 | 11/1977 | Ravani et al. . |
| 4,119,042 | 10/1978 | Naves et al. . |
| 4,119,043 | 10/1978 | Naves et al. . |
| 4,149,472 * | 4/1979 | Naves et al. .......................... 410/26 |
| 4,238,168 | 12/1980 | Naves .................................... 410/27 |
| 4,248,557 | 2/1981 | Roldness et al. ...................... 410/27 |
| 4,759,668 * | 7/1988 | Larsen et al. .......................... 410/26 |
| 4,759,669 | 7/1988 | Robertson et al. .................... 410/29 |
| 4,801,229 * | 1/1989 | Hanada et al. ........................ 410/26 |
| 5,085,555 | 2/1992 | Vartanian . |
| 5,676,507 * | 10/1997 | Lugo .................................. 410/29.1 |

* cited by examiner

Primary Examiner—Stephen T. Gordon
(74) Attorney, Agent, or Firm—Chernoff, Vilhauer, McClung & Stenzel LLP

(57) ABSTRACT

A covered railroad car includes a car body having a pair of sidewalls and at least a pair of parallel horizontal support beams extending along each of the sidewalls at substantially the same vertical height. An interior deck portion is pivotally connected to the pair of support beams so as to move about a pivot axis on each respective support beam and a pair of brackets are coupled respectively to each of the support beams. A pair of spring-loaded lift assist mechanisms are coupled respectively between each one of the pair of brackets and the interior deck portion and spaced apart from the pivot axis so as to provide a lifting force causing the interior deck portion to pivot about each pivot axis.

8 Claims, 2 Drawing Sheets

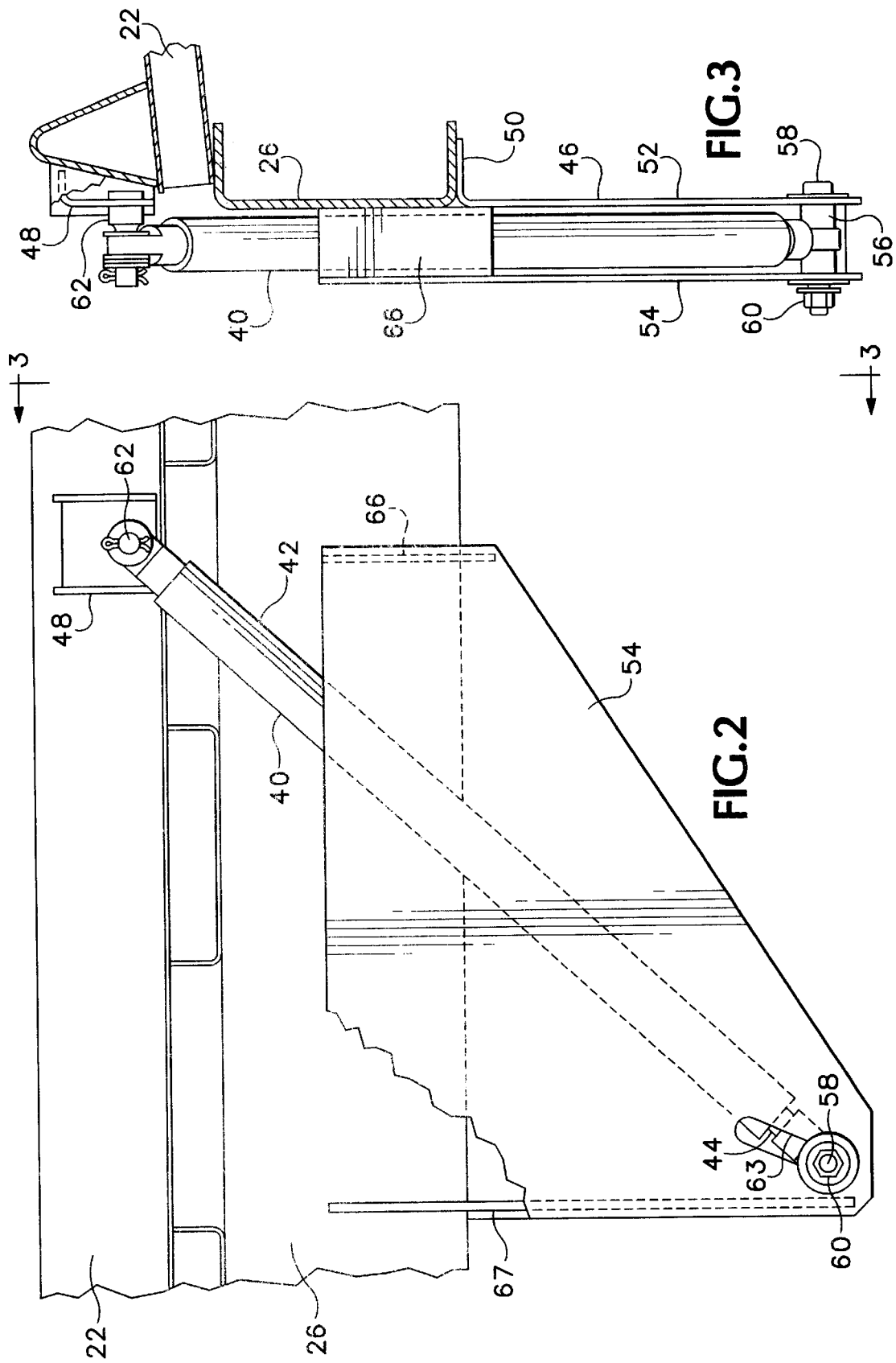

LIFT ASSIST MECHANISM FOR RAILROAD CAR DECK

BACKGROUND OF THE INVENTION

The present invention relates to a moveable deck in the interior of a railroad freight car for carrying motor vehicles on multiple levels.

Railroad freight cars have long been used for transporting newly manufactured automobiles long distances from a point of manufacture or a point of arrival to cities where dealerships are located or where the automobiles are reloaded onto trucks for moving the automobiles over highways to the locations of dealerships. In order for such railroad cars to be most economical, it is desirable that they carry a maximum number of motor vehicles but it is also desirable that the freight cars be able to carry several different types of motor vehicles on each car and be able to reconfigure the railroad freight car to carry such different types of vehicles without undue difficulty.

It is known to adjust load carrying decks in motor vehicle carrying railroad cars to facilitate carrying different types of motor vehicles but provisions for making such adjustments in the past have been difficult.

A solution to this problem is shown in the apparatus described in U.S. Pat. No. 5,979,335 entitled Railroad Freight Car for Carrying Motor Vehicles, the specification of which is incorporated herein by reference. The '335 patent, which is owned by the assignee of the present invention, discloses a multi-unit railroad freight car for carrying motor vehicles on multiple levels. This is accomplished by providing a plurality of motor vehicle decks spaced apart inside the car wherein the decks are adjustable in height.

The endmost middle level deck in each unit is mounted on a pivot axis at one end so that the other end may be raised and lowered to facilitate the loading and unloading of vehicles on the next lowest deck. A cable and winch system is used to raise and lower the hinged portion of the deck. When a manually operated cable system used to raise and lower the deck, the entire weight of the deck is borne by the cable and winch. The deck is heavy and some operators may have difficulty raising and lowering it with only a mechanical crank. In addition, because of the weight it may be difficult for the operator to tell when the deck is fully raised.

BRIEF SUMMARY OF THE INVENTION

The present invention provides a spring loaded assist mechanism connected to a bracket coupled to interior beams which support the interior deck portions for partially supporting the weight of the deck when it is raised or lowered. The lift assist mechanism has an extensible arm coupled between the support beams and a moveable portion of the deck for providing a lifting force for helping the interior deck portion to be raised. The lifting force provided by the spring mechanism assists the winch operator so that the entire dead weight of the deck portion is not borne entirely by the winch cable. Although the stroke of the lift assist mechanism is fixed, it is disposed inside a slot in a mounting bracket oriented in the direction of the extensible arm. Thus, when the deck has attained its uppermost height and the arm is fully extended, the lift assist mechanism can go no further, but can move as a unit within the slot. When this happens, the abrupt change in weight experienced by the winch operator signals that the deck is fully raised.

The lift assist mechanism is preferably a gas cylinder having a piston and cylinder arrangement wherein one end of the gas cylinder is coupled to a bracket connected to a horizontal support beam and the other end of the gas cylinder is connected to a bracket affixed to a pivotable deck portion. The bracket itself may be a pair of parallel plates and associated cross members welded to the underside of the support beam and occupying the interior space between the horizontal support beam and the vertical support posts for the railroad car body side. In this way, the brackets and the gas cylinder are situated in unused space and do not interfere with anything else inside the railroad freight car.

The foregoing and other objectives, features, and advantages of the invention will be more readily understood upon consideration of the following detailed description of the invention, taken in conjunction with the accompanying drawings.

DESCRIPTION OF THE SEVERAL VIEWS OF THE DRAWINGS

FIG. 2 is a partial side cutaway view of the lift assist mechanism shown in FIG. 1.

FIG. 3 is an end view taken along line 3—3 of the lift assist mechanism of FIG. 2.

DETAILED DESCRIPTION OF THE PREFERRED EMBODIMENT

Figure 1:
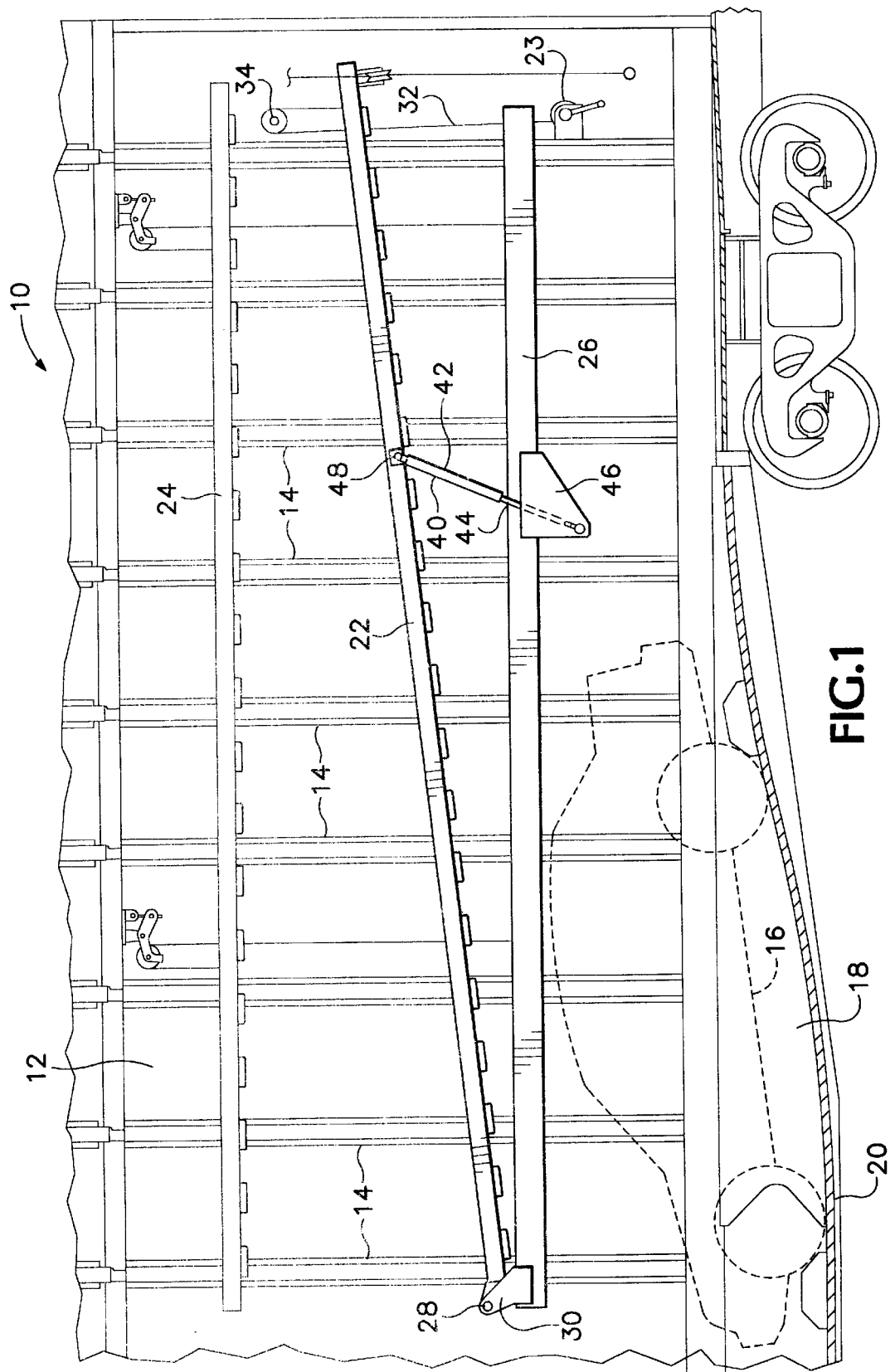
FIG. 1 is a partial side cutaway view of a railroad car employing the lift assist mechanism of the present invention.

Referring to FIG. 1, a railroad car 10 includes an interior side wall 12. Only one such side wall is shown in the drawings and it should be understood that the opposite side of the railroad car 10 has exactly the same construction as will be described herein with respect to the side wall 12. The side wall 12 is secured to vertical posts 14 which line the inside of the railroad car 10. Automobiles, such as automobile 16 (shown in phantom outline), are stored inside the railroad car. Only one such automobile 16 is shown in FIG. 1 and this automobile is stored inside a cargo well 18, the lower surface of which forms the floor 20 of the railroad car 10.

FIG. 1 shows two decks 22 and 24. Deck 22 is a moveable deck portion which is pivotally connected to a horizontal support beam 26 by a pivot pin 28 which is housed within a bracket 30 welded to the horizontal support beam 26. The horizontal support beam 26 is, in turn, secured to each of the vertical posts 14 by means of bolts and the like (not shown).

The moveable deck portion 22 is raised and lowered by means of a cable 32 looped over a pulley 34. The cable 32 is controlled by a hand-cranked winch 36.

A spring loaded lift assist mechanism 40 comprises, preferably, an air cylinder 42 and a reciprocating piston 44. The lift assist mechanism 40 is coupled to a bracket 46 which is welded to the support beam 26. An upper bracket 48 is welded to the moveable deck 22 to receive the other end of the lift assist mechanism 40.

Referring now to FIGS. 2 and 3, the bracket 46 includes a flange 50 which is welded to the underneath of the support beam 26. The bracket 46 therefore extends into an interior space that lies between the support beams 26 and the vertical posts 14. In this way, the lift assist mechanism is situated in what is otherwise unused space inside the railroad car and does not interfere with any other structure or cargo inside the car. The bracket 46 comprises a pair of parallel plates 52 and 54 separated by cross plates 66 and 67 which are welded to plates 52 and 54 to form a rigid unit.

The lift assist mechanism 40 is supported in the bracket 46 on a centering spacer 56. A bolt 58 extends through the spacer 56 and is secured at the opposite plate by a nut 60. The nut and bolt combination extends through a slot 63 in the bracket 46. The slot 63 allows some leeway for connecting the lift assist mechanism 40 during assembly. This is necessary because the opposite end of the lift assist mechanism 40 is affixed to an upper bracket 48 at a fixed point. The slot 63 also permits the mechanism 40 to move as a unit when the gas cylinder is fully extended. When this occurs, the sudden change in weight on the winch crank signals that the deck is fully raised. The gas cylinder 42 has an end that is secured to a pin 62 which is coupled to the upper bracket 48. The upper bracket 48 is welded to the moveable deck portion 22 at a point approximately two-third's of the distance from the pivot pin 28 to the forward end of the deck portion 22.

The lift assist mechanism is preferably a pneumatic or gas spring. An example of the type of gas spring suitable for this purpose is manufactured by Industrial Gas Springs, Inc. of Newton Square, Pa. The gas spring mechanism 40 provides a lift assisting force as the moveable deck portion 22 is raised by the winch 36. The winch 36 is adapted to be hand-cranked.

As an alternative, other types of lift assist devices may be used. For example, a mechanical spring could be used in place of an gas spring or hybrids of gas, air and mechanical spring combinations may also be used.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a covered railroad car having a car body comprising a pair of side walls and at least a pair of parallel horizontal support beams extending along each of said side walls at substantially the same vertical height, the combination comprising:

(a) an interior deck portion pivotally connected to said pair of support beams so as to move about a pivot axis on each respective support beam;

(b) a pair of brackets coupled respectively to each of the support beams; and (c) a pair of spring loaded lift assist mechanisms coupled respectively between each one of said pair of brackets and said interior deck portion, and spaced apart from said pivot axis, whereby to provide a lifting force causing said interior deck portion to pivot about each pivot axis.

2. The combination of claim 1 wherein the lift assist mechanism comprises an pneumatic cylinder and piston combination.

3. The combination of claim 1 wherein the lift assist mechanism comprises a mechanical spring.

4. The combination of claim 1 wherein said brackets each comprise a pair of parallel plates connected by at least one cross piece and housing said lift assist mechanism.

5. The combination of claim 4 wherein each respective bracket includes a flange affixed to an underside of each respective support beam.

6. The combination of claim 5 wherein said support beams are mounted on interior vertical posts thereby defining an interior space between said support beams and said side walls and said flange is offset from said bracket such that said lift assist mechanism is situated within said interior space.

7. The combination of claim 6 wherein said lift assist mechanism comprises a piston member and a cylinder member, said cylinder member coupled to said bracket and said piston member coupled to a mounting pin on said interior deck portion.

8. The combination of claim 4 wherein said parallel plates include a mounting slot generally oriented in a direction of travel of said lift assist mechanism for receiving a securing member affixing said lift assist mechanism to said bracket.

\* \* \* \* \*